Oct. 30, 1934.  H. SINGER  1,979,083
FURNACE
Filed July 27, 1933
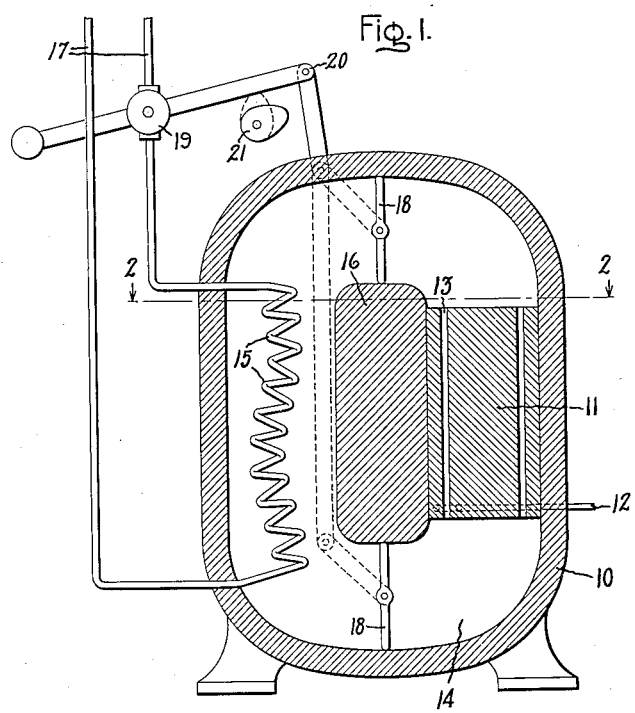
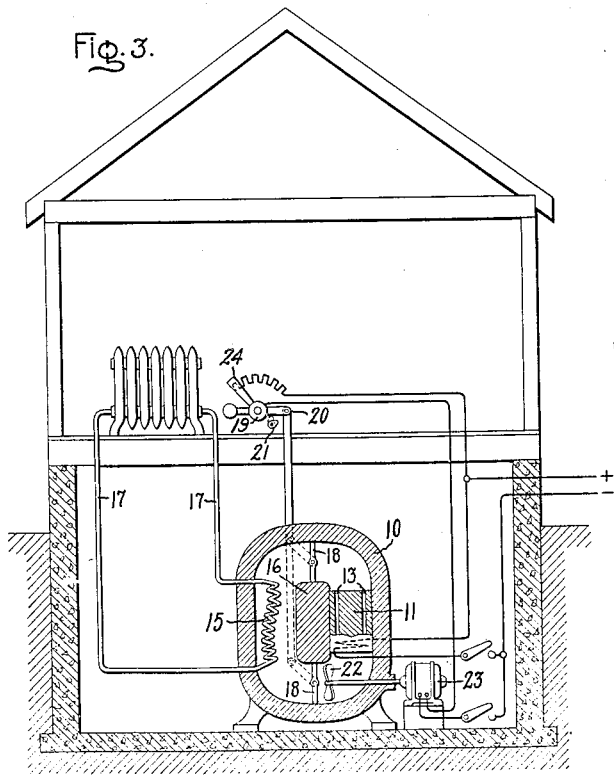
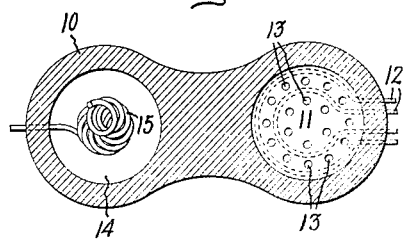
Inventor:
Hanns Singer,
by Harry E. Dunham
His Attorney.

Patented Oct. 30, 1934

1,979,083

UNITED STATES PATENT OFFICE 1,979,083

FURNACE

Hanns Singer, Berlin-Steglitz, Germany, assignor to General Electric Company, a corporation of New York Application July 27, 1933, Serial No. 682,493
In Germany August 13, 1932

5 Claims. (Cl. 219—38)

The present invention relates to furnaces of the accumulator type in which the heat produced is maintained in storage and subsequently released for heating purposes.

One of the objects of the present invention is to provide an accumulator furnace having improved means for regulating the release of the heat. More specifically the object is to provide an improved arrangement for transmitting the heat from the storage medium to a heat-distributing system such that the transfer of heat can be started, stopped, and the rate of transfer controlled most effectively.

It has already been proposed to install heat-distributing coils or some other tube heating system in the storage material of accumulator furnaces which coils or tubes contain a heat-distributing medium which is caused to circulate and which delivers up its heat by means of radiators or the like to the rooms to be heated. In almost every case, the heat-distributing medium employed is water, the boiling point of which, as is well known, lies at approximately 100° C. In order to avoid dangerous pressures in the piping which may arise if the circulation of the water is stopped by means of the cocks installed in the piping, the storage material must not be heated to such a high temperature that the water in the immediately adjoining heating coils is caused to boil. Furthermore in most installations the necessity arises for providing a comparatively large quantity of storage material in order that the desired quantity of heat may be accumulated.

Therefore a special object of the present invention is to improve the construction of the accumulator furnace so that the storage material may be heated to higher temperatures than 100° C., in order to be able to use a smaller quantity of storage material and obtain the same amount of accumulated heat. With the high temperature storage material in the furnace, the transmission of heat from the storage material to the heating coil or coils or the like can be regulated most effectively in accordance with the present invention.

In the preferred embodiment of the invention the heat-distributing coils or tubes are arranged in the furnace in a passage which adjoins the heat storage material in sections. This passage contains a moving heat-transmitting medium serving to transmit the heat from the storage material to the distributing medium such as water contained in the heating coil. For this heat-transmitting medium, air, hydrogen or other fluid substances are suitable. The transmitting medium is maintained in circulation either by convection currents or artificially. Regulating valves are inserted in the passage in the furnace which enable the cross-section of the latter to be altered. By this means it is possible to start, stop, or vary the circulation of the transmitting medium and thus effectively regulate the heat given up by the storage material to the heat-distributing coil.

One method of carrying out the invention is shown in the drawing, Fig. 1 being a longitudinal section of the improved accumulator furnace; Fig. 2 a cross-section of the furnace on the line 2—2 and Fig. 3 a modification of the heat transfer control.

The furnace consists of the casing 10 which is constructed so as to serve as a heat-conserving casing. In the interior of the casing, the heat storage element 11 consisting of a mixture of iron and aluminum chlorides, or other suitable material having a high thermal capacity, is placed.

The mixture in question preferably consists of aluminum chloride, sodium chloride and iron chloride which are mixed in the proportion of about 6:3:1. Such a mixture melts at about 60° C. and can be heated far above 1000° C. without decomposition. In this way it is possible to store up large amounts of heat in a relatively small space. The heating must, of course, take place with the air excluded.

It may be pointed out that other suitable mixtures may be used with the present invention which consists of the utilization of high storage temperatures and the means necessary therefor. Therefore the above salt mixture is mentioned only as an illustration for carrying out the invention whereas the invention can be used with other heat storage mixtures having high thermal capacity.

One or more electric heater windings 12 are embedded in this storage material. This heat accumulator element is provided with a large number of vertically disposed passages 13 connected in parallel to one another. These passages 13 are preferably located in concentric groups, as shown in Fig. 2, with the convolutions of the heater windings disposed between said groups of the passages to facilitate uniform heating of the heat storage material. The storage element 11 is located in one leg of the annular passage 14 formed inside of casing 10. In the other leg of this passage 14 the heat-distributing coil 15 containing a heat-distributing medium such as water is arranged. The coil 15 is separated from the heated storage element 11 by a heat-protecting core 16. It will be understood that distributing coil 15 is connected by the pipes 17 to the radiators installed in the rooms to be heated.

The annular passage 14 of the furnace is entirely closed and contains a heat transfer medium such as air, hydrogen, mercury or the like which may be heated to a high temperature without becoming unstable or developing excessive pressures. Communication between the legs of the annular passage 14 is controlled by regulating valves 18 which are inserted in the top and bottom of the passage between the heat storage element 11 and the heat-distributing coil 15, the control adjustments preferably being made at these points. The piping 17 in which the heated water is led from the heating coil 15 to the radiators is provided with a temperature-responsive regulator 19 which functions to adjust the valves 18 in accordance with the temperature of the water or the like leaving the heating coil 15 by a lever mechanism 20. The valves 18 may be held closed independently of regulator 19 by means of the cam 21. In this way the temperature regulator may be cut out. If desired, the regulator 19 may be made directly responsive to the temperature of the room as indicated in Fig. 3.

The procedure when charging and discharging the accumulator furnace is as follows: When no heat is needed in the radiators and the accumulator element 11 has to be charged, the valves 18 are closed by turning the cam 21. The storage material 11 is then heated up by connecting the heater winding 12 to the electric supply network. The heat thus produced in element 11 tends to drive the liquid or gaseous medium contained in the passage 14 upwards and set it in circulation, which is prevented however by the closed control valves 18. When the temperature of the storage material 11 has risen to the desired value, the cam 21 is turned from the dotted position to the position shown in full lines and thus releases the temperature regulator 19 which then opens the valves 18 in case the temperature in the heat-distributing piping is comparatively low. There is now nothing further to oppose the circulation of the medium contained in the passages 13 and 14. Thus, in accordance with the driving force exerted by the accumulator heat in the example shown, it flows in an anti-clockwise direction from the passages 13 upwards, next flowing along the heating coil 15 whereby it is cooled, and then returns around through the passages 13 once more from below where it is heated up again.

To enable all parts of the heating coil 15 to have an equally good heat absorption, a spiral shape preferably is chosen for them, the axis of which is likewise of spiral form. In this way, the separate turns cannot lie in the current shadow of the coil in front of them with respect to the circulating medium. As soon as the water or other medium contained in the heating coil 15 has reached the desired temperature to which the temperature regulator 19 has been adjusted the valves 18 are moved to such a degree as to produce a reduction in the internal cross-section of the passage 14 at these points. In this way the rate of circulation of the medium contained in the passage 14 which transmits the heat absorbed in the passages 13 to the heating coil 15 will be prevented more or less and consequently the transmission of heat from storage element 11 to the heating coil 15 will be more or less restricted. The regulating device 19 is arranged in such a way that it is able to maintain an approximately constant desired temperature in the heat-distributing medium leaving the heating coil 15. The heating coil 15 supplies the heat-transmitting medium, which has been heated in it, to the room radiators through the pipes 17. The charging of the accumulator may of course also take place with the temperature regulator in action, that is to say, with the regulating valves 18 open.

The circulating heat-transmitting medium must not be such as to decompose in the passages 13 and 14 of the accumulator furnace at the high temperature to which the element 11 reaches. Also when a liquid is employed, it must not be such as to boil at these temperatures.

The circulation of the transmitting medium in the accumulator passage 14 may be maintained artifically by means of a fan or pump 22 driven by a motor 23 as shown in Fig. 3. In this case the temperature regulator 19 is responsive to room temperatures and is allowed to regulate the speed of the motor 23 by means of a speed regulator 24 in such a way that the desired temperature of the room is maintained approximately constant. The fan is preferably installed at one side of the valve 18 in the passage 14 as shown.

What I claim as new and desire to secure by Letters Patent of the United States is:

1. An accumulator furnace comprising a heat-insulating casing having an annular closed passage for containing a fluid heat transfer medium therein, a high temperature heat storage element located in one portion of said passage, a heat-distributing element located in another portion of said passage, and means for regulating the circulation of the fluid heat transfer medium in said passage including a pair of valves in said passage disposed one on each side of said storage element, and means for simultaneously operating said valves to close the passage on both sides of said heat storage element.

2. An accumulator furnace comprising a heat-insulating casing having a closed annular passage formed therein for containing a fluid heat transfer medium, a heat storage element including a mass of high temperature capacity salt mixture located in one portion of said passage and having a plurality of smaller passages for the circulation of said heat transfer medium therethrough, means for imparting heat to said element including an electric heating coil embedded in said mixture, a heat absorbing and distributing element located in another portion of said passage, and adjustable valve means located in said passage between said storage element and said heat absorbing and distributing element for regulating the rate of circulation of the fluid heat transfer medium in said passage.

3. An accumulator furnace comprising a heat-insulating casing having a closed reentrant passage formed therein, a heat storage element including a high temperature capacity salt mixture located in one portion of said passage and having a plurality of concentric groups of smaller passages extending therethrough, means for uniformly heating said heat storage element including an electric coil having its convolutions embedded in said mixture concentrically with said groups of small passages, a heat absorbing and distributing element located in another portion of said reentrant passage, a low temperature fluid heat transfer medium adapted to circulate around said reentrant passage, and means including valves for starting and stopping and regulating the rate of circulation of said fluid heat transfer medium.

4. An accumulator furnace comprising a heat-insulating casing having an annular closed passage formed therein, a container having a high temperature capacity heat storage salt mixture therein filling one portion of said passage and having a plurality of smaller passages extending therethrough, means for heating said mixture including an electric coil embedded therein, a heat absorbing and distributing water coil located in another portion of said passage, a low temperature fluid heat transfer medium adapted to circulate in said annular closed passage and through said plurality of smaller passages, means for forcing circulation of said heat transfer medium, valve means located in said passage for stopping circulation of said heat transfer medium, and temperature responsive means for controlling said forced circulation means and said valve means.

5. An accumulator furnace comprising a heat-insulating casing having an annular closed fluid-tight passage formed therein, a container filling one portion of said annular passage and having a high temperature heat storage salt mixture therein with a plurality of uniformly distributed smaller passages extending through said container and said mixture, means for heating said mixture including a plurality of electrical coils embedded therein and disposed between groups of said smaller passages, a water heating coil located in another portion of said annular passage, a low temperature fluid heat transfer medium adapted to circulate in said closed annular passage and through said smaller passages to transfer the heat from said storage mixture to said water coil, an impeller pump for circulating said heat transfer medium, valve means for closing said annular passage to stop circulation of said heat transfer medium, and thermostatic means for controlling the operation of said valve means and said motor driven pump.

HANNS SINGER.